United States Patent [19]

Crosby et al.

[11] 4,246,227

[45] Jan. 20, 1981

[54] METHOD OF MAKING A UNITARY BOWL, WATERWAY, AND TRAP FOR A TOILET

[75] Inventors: Samuel C. Crosby, Ann Arbor; Thomas M. Whitney, Lapeer; William F. Price, Livonia, all of Mich.

[73] Assignee: Trayco, Inc., Lapeer, Mich.

[21] Appl. No.: 15,040

[22] Filed: Feb. 26, 1979

Related U.S. Application Data

[62] Division of Ser. No. 761,743, Jan. 24, 1977, Pat. No. 4,145,776.

[51] Int. Cl.³ .................. B29C 17/07; B29C 17/10
[52] U.S. Cl. ............................. 264/536; 264/541; 425/525
[58] Field of Search ............. 4/330, 331, 332, 420, 4/421, 425, 429, 300, 323, 329; 264/523, 536, 540-543; 425/525

[56] References Cited

U.S. PATENT DOCUMENTS

| | | | |
|---|---|---|---|
| 3,212,106 | 10/1965 | Noel | 4/421 |
| 3,291,670 | 12/1966 | Usab | 264/536 X |
| 3,591,868 | 7/1971 | Owens | 4/300 |
| 3,719,209 | 3/1973 | Rush et al. | 138/177 |
| 4,070,430 | 1/1978 | Confer | 264/540 |

FOREIGN PATENT DOCUMENTS

| | | | |
|---|---|---|---|
| 2323035 | 11/1974 | Fed. Rep. of Germany | 264/536 |
| 51-91967 | 12/1976 | Japan | 264/527 |

Primary Examiner—Jan H. Silbaugh
Attorney, Agent, or Firm—Cullen, Sloman, Cantor, Grauer, Scott & Rutherford

[57] ABSTRACT

Disclosed are an integral plastic bowl, waterway and trap for a toilet and the method of making the product. The bowl is concave and leads into a trap which may be interconnected with a standard closet flange. The waterway is vertically aligned with the trap and slopes downwardly from an inlet to an outlet, which is preferably at a position near the bottom interior of the bowl and which also preferably includes a wall surface in overlying alignment with at least a portion of the downwardly sloping waterway portion. During flushing, water from a reservoir flows down the waterway, against the outlet wall surface causing a vortex in the bowl, and then out of the bowl into the trap. In the method of making the product, a plastic parison is positioned between the sections of a blow mold. Next, the mold sections are closed, pinching portions of the parison shut to partially form the trap and waterway and enclosing another parison portion in a bulbous mold cavity. Blow fluid under pressure is injected into the interior of the parison to form a blown article which is then removed from the mold and trimmed to form the final product.

1 Claim, 12 Drawing Figures

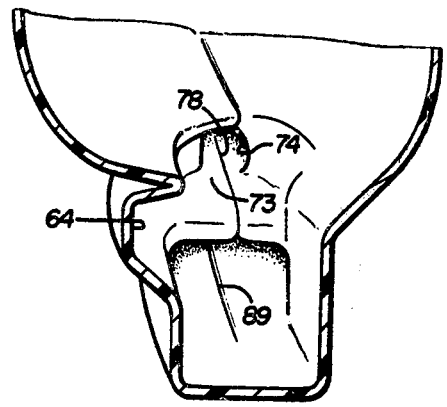
FIG. 3
FIG. 2
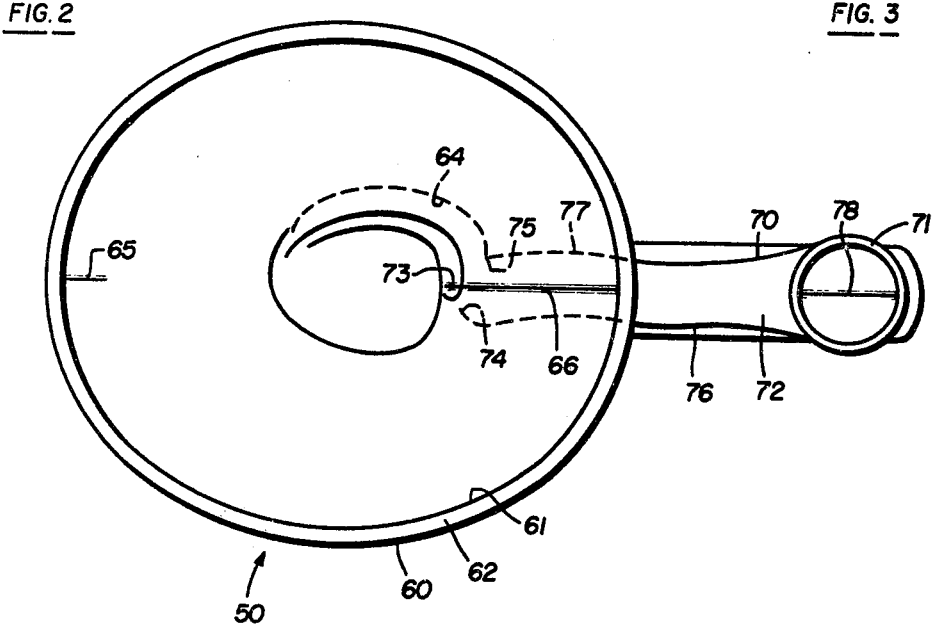
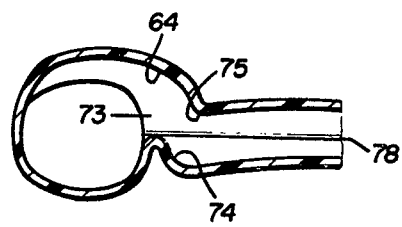
FIG. 4

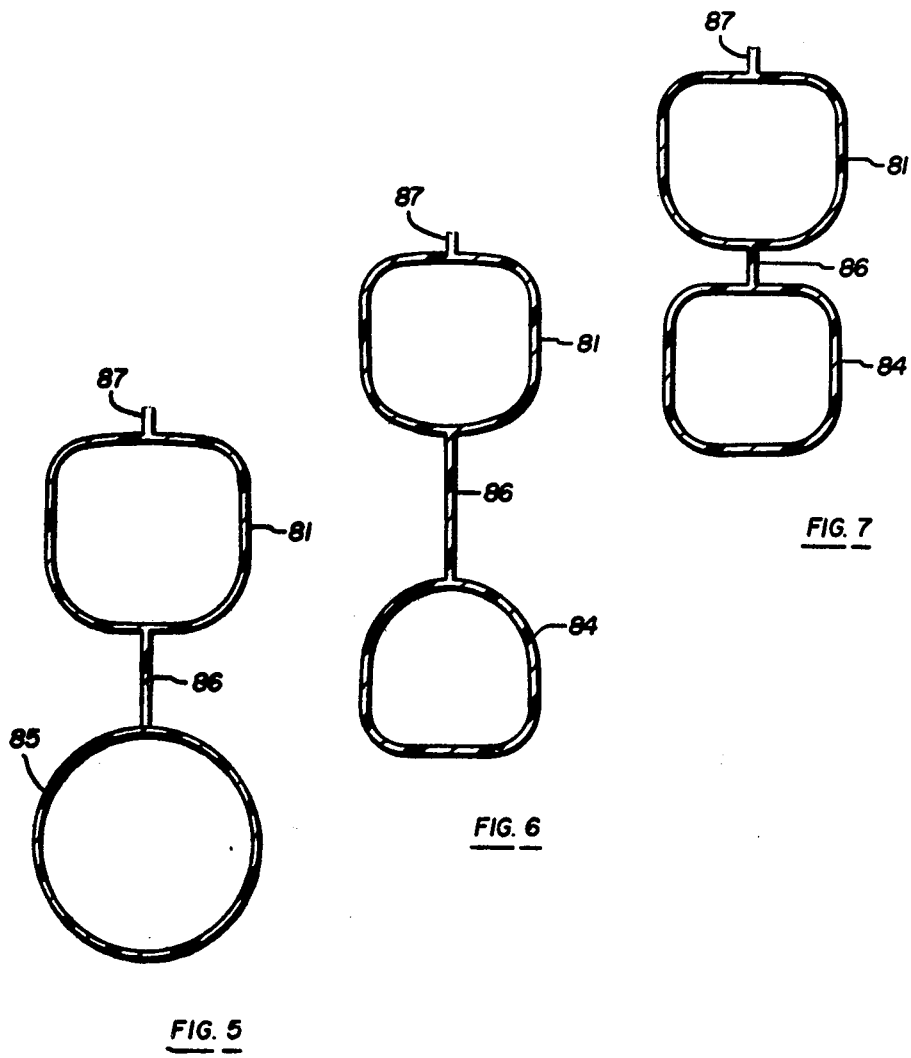

METHOD OF MAKING A UNITARY BOWL, WATERWAY, AND TRAP FOR A TOILET

This is a division of appliction Ser. No. 761,743, filed Jan. 24, 1977, now U.S. Pat. No. 4,145,776, issued Mar. 27, 1979.

BACKGROUND OF THE INVENTION

1. Field of the Invention

The present invention relates generally to a bowl, waterway and trap for a toilet and to the method of manufacture. More specifically, the bowl, waterway and trap are integral and unitary, are free of any joints, and are made in a blow molding operation from a tubular plastic parison.

2. The Prior Art

Toilets have conventionally been made from ceramic or vitreous china in order to meet applicable codes which require several features, including the absence of joints and cracks to prevent harbors for bacteria growth. In the method of making these prior types of toilets, up to thirteen or more components are individually made and then assembled together. The assembled components are then covered with a common material to fill the joints and placed back into a kiln for a second phase of firing. As a result, substantial manual labor is required in assembling the various components and then coating the assembly and substantial energy is required due to multiple passes through the kiln. Additionally, such toilets are not easily handled because of their weight and are subject to breakage during shipping and installation.

Accordingly, a long-felt need has existed for a practical replacement for the prior art toilet in order to overcome these and other recognized disadvantages and shortcomings.

SUMMARY OF THE INVENTION

The present invention overcomes these prior art problems in an integral, unitary bowl, waterway and trap which is made of a water impervious, plastic material, preferably in a blow molding operation.

In the disclosed embodiment the bowl is concave, having an interior surface leading into a trap in the bottom of the bowl. The trap includes a frist end communicating with the bowl, a second end for connection to a water closet flange, and a tubular section interconnecting the two ends. A waterway between the trap and bowl includes an upper inlet opening to receive water, an elongated duct sloping downwardly from the inlet and terminating in an exit opening in the lower interior of the bowl at a position above the trap inlet. A wall surface in the waterway adjacent the exit opening overlies at least a portion of the downwardly sloping waterway portion to direct water in a direction along the interior surface of the bowl to establish a strong vortex during flushing.

More preferably, the concave bowl includes a major opening at its top and a minor discharge opening at its bottom leading into the trap, with the two openings being substantially perpendicular to a reference plane through their respective midpoints.

Additionally, the exit opening in the waterway preferably includes an outside wall defining an outer radius of a bend which constitutes the wall surface that is in overlying alignment with the downwardly sloping waterway portion. An inside wall on the opposite side of the reference plane from the outside wall blends into an outwardly projecting channel formed in the interor wall of the bowl above and adjacent to the trap inlet. The channel extends around approximately one-half of the interior periphery of the bowl and progressively decreases in depth, serving to direct water from the waterway around the interior surface of the bowl to assist in establishing a vortex for flushing.

Optionally, but preferably, the downwardly sloping portion of the waterway curves to assist in turning the flow of water at the waterway exit opening.

In the disclosed method of making the unitary bowl, waterway and trap of the present invention, a tubular parison is first placed between a pair of blow mold sections. Next, the blow mold sections are closed on the parison to form a blowable shape comprising parison portions destined to form the bowl, trap and waterway, by simultaneously (1) enclosing a major part of the parison within a bulbous major part of the blow mold cavity, including the bowl for the final article, (2) pinching a portion of the parison shut along a tortuous path communicating with the major part of the blow mold cavity and conforming to the trap, and (3) pinching another portion of the parison shut along a waterway communicating with the major part of the parison between the trap and the bowl parison portions. Thereafter, blow fluid under pressure is introduced into the interior of the parison to expand the major part of the parison into a bulbous shape including the bowl and to expand the pinched-shut parison portions respectively into a tortuous-shaped trap and a waterway.

After the blow molding operation, the blown article is removed from the mold cavity and a series of trimming operations are performed. More specifically, the bulbous shape is trimmed along an annular line to form a concave bowl having an upper rim, the upper end of the waterway is trimmed to form an inlet, and the lower end of the trap is trimmed to form a discharge opening.

As a result of the blow molding operation, the trap and waterway will include fused seams which correspond to the pinch lines of the mold sections. Importantly, these fused seams do not constitute joints which foster biological growth during use of the product. Also as a result of the blow molding operation, reinforcing webs of plastic material may optionally be formed between the bowl, waterway, and trap segments.

Accordingly, the present invention relates to an integral, unitary bowl, waterway and trap providing numerous advantages over the prior art. Specifically, the present invention provides a product which (1) is made of a water-impervious, discoloration-resistant plastic material having an essentially smooth, slick interior surface to facilitate flushing, waste removal, and cleaning; (2) is relatively inexpensive in comparison with the prior art products; (3) is free of joints and provides no harbors for significant biological growth, thereby meeting applicable code specifications; (4) is light and is therefore easy to handle and inexpensive to ship; (5) achieves an immediate, strong vortex and siphon, thereby facilitating the removal of waste and reducing water consumption; (6) is not easily damaged during shipping and installation; and (7) conserves energy due to the manufacturing method employed.

These and other meritorous features and advantages will be more fully appreciated from the following detailed description and the appended claims.

BRIEF DESCRIPTION OF THE DRAWINGS

FIG. 2 is a top plan view of the bowl, waterway, and trap, particularly illustrating the waterway and an indent in the lower portion of the bowl for facilitating the formation of a strong vortex.

FIG. 3 is an enlarged, fragmented, perspective view of a region of the product which corresponds to the bottom of the bowl, the outlet from the waterway, and the initial region of the trap.

FIG. 4 is a sectional view taken along plane 4—4 as shown in FIG. 1, illustrating the channel-shaped indent and the exit region of the waterway.

FIGS. 5, 6, and 7 are cross-sectional views taken along respective planes 5—5, 6—6, and 7—7, as shown in FIG. 1, illustrating the cross-sectional configuration of the trap.

DETAILED DESCRIPTION OF THE PREFERRED EMBODIMENT

Figure 1:
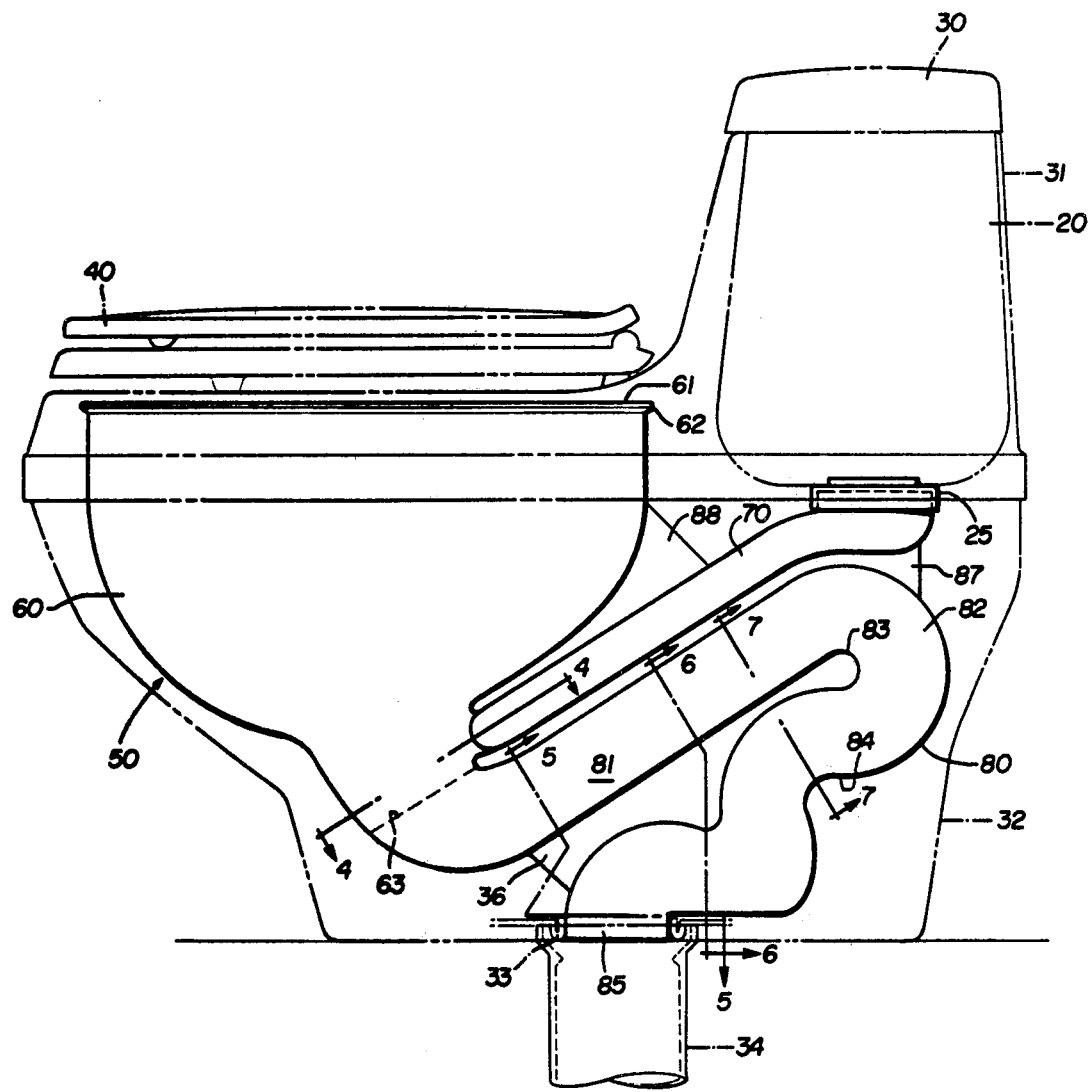
FIG. 1 is a side elevational view, illustrating the integral bowl, waterway and trap as it might be assembled in combination with other components of a toilet.
Figures 8, 9:
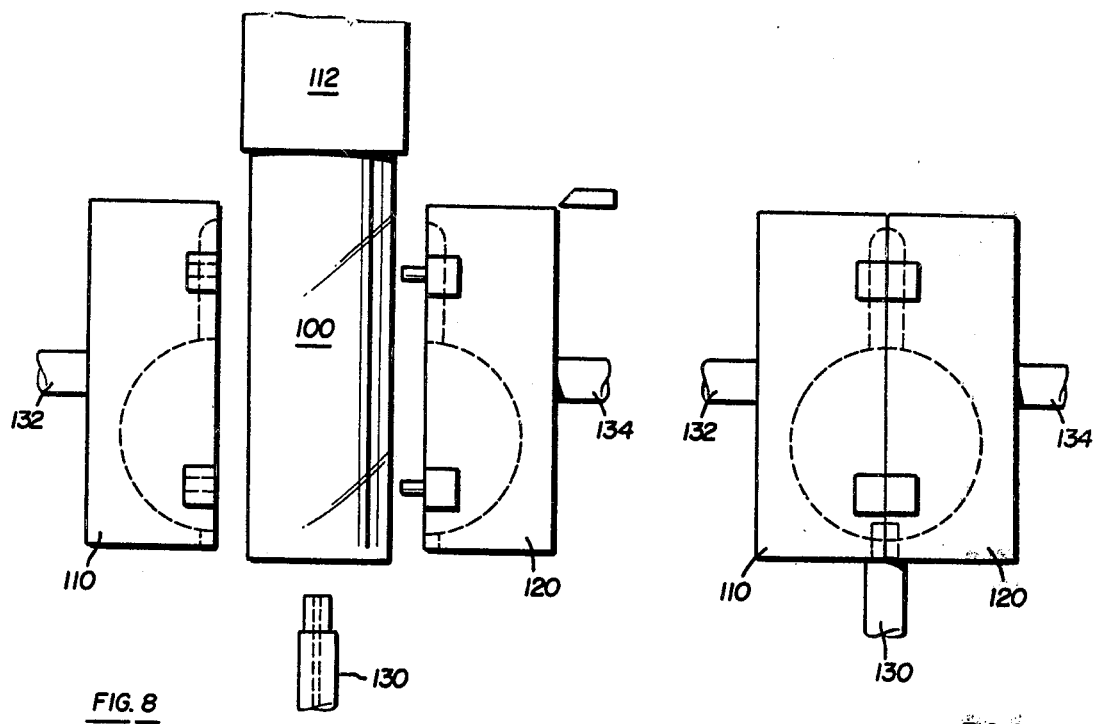
FIGS. 8 and 9 are schematic illustrations of the mold assemblies for making the unitary bowl, waterway and trap.

Turning now more particularly to the drawings, the product of the present invention is shown in FIG. 1 generally by the reference numeral 50 as including an integral, unitary bowl 60, waterway 70 and trap 80. Other components of an overall toilet assembly are shown in phantom, but do not form a part of the present invention. These other components include a tank or reservoir 20 which is interconnected with the upper portion of the waterway 70 by a suitable coupling 25. A rim flush (not shown) delivers water from the tank 20 to the top of the bowl 60 to assist in the flushing action. An outer shell or casing may include a lid 30, a separate top component 31 to cover the tank and the top of the bowl, and a separate component 32 to cover the waterway and trap. A flange 33 on the lower component 32 surrounds the outlet of the trap and is surrounded by a standard water closet flange 34. As is conventional, a standard wax seal may be used between the trap 80 and the closet flange 34. Likewise, a standard seat 40 may be assembled to the upper shell component 31.

Turning now more particularly to the specific portions of the integral bowl, waterway and trap:

The bowl 60, as best shown collectively in FIGS. 1 and 2, is concave in a conventional manner, including an upper opening 61 which is optionally circumscribed by a flange 62. At the other end of the bowl is an imaginary discharge opening illustrated by the phantom line and reference numeral 63, with the discharge opening leading into the trap 80. For purposes of definition, the upper portion of the bowl may be discribed as being essentially symmetrical about a reference plane in the plane of FIG. 1, with the reference plane being essentially perpendicular to both the upper and lower openings 61 and 63.

FIGS. 2, 3, and 4 best illustrate a channel-shaped indent 64 which is included in the lower interior surface of the bowl above the discharge opening 63. The indent extends around approximately one-half the interior periphery of the bowl and gradually decreases in depth in order to assist the formation of a water vortex during flushing.

FIG. 2 illustrates that the bowl may include fused seams 65 and 66 which may result when the article is formed in the preferred, disclosed blow molding operation. As will become apparent from the following detailed description of that manufacturing method, the seams will be formed along pinch lines in the blow molding tool and will have the same thermal history as the other plastic material in the product.

The waterway, as best shown collectively in FIGS. 1-4, includes an upper inlet 71 which is interconnected with a tank. A downwardly sloping duct 72 extends from the inlet 71 to an exit opening 73 which blends into the channel-shaped indent 64. Most preferably, an outside wall 74 overlies a portion of the duct 72 at the opening. This outside wall is formed essentially along a bend generated by a radius, with the wall terminating esentially on the reference plane. An inside wall 75 on the other side of the reference plane from outside wall 74 blends directly into the indent. The outside wall 74, in cooperation with the inside wall 75, turns the water flow at the exit opening 73 to follow indent 64 in order to form a vortex during flushing to efficiently remove waste.

Upstrean from the exit opening 73, the duct 72 preferably includes gradual curves shown by reference numerals 76 and 77. These gradual curves along the length of the duct 72 serve to impede the flow of water in order to more effectively turn the water at wall 74 to establish the desired vortex. In the most preferred embodiment, the duct 72 is at an angle with the horizontal of about 30°, and includes seme lines 78 formed as a result of the preferred blow molding operation.

As an alternative to the illustrated arrangement, the waterway 70 may flow directly into the trap 80 in the event that a siphon-jet action is desired.

The trap, as best shown in FIGS. 1, 3, and 5-7, includes a first portion 81 extending upwardly from the bowl discharge region 63 to an elbow 82. The elbow includes a lip 83 which establishes the water level in the bowl. A second, tortuous-shaped trap portion 84 extends downwardly from the elbow to an outlet 85.

As shown in FIGS. 5-7, the cross-sectional area of the trap generally decreases from the trap inlet region to a region just upstream from the discharge 85 at about a position where section 66 is taken in trap portion 84. This decrease in cross-section cooperates with the tortuous path of section 84 to impede flow of water during flushing to back the water up in the bowl in order to assist in the formation of a vortex.

In the most preferred embodiment, the upwardly extending trap section 81 is generally parallel to the waterway duct 72. Further, optional reinforcing ribs 86 and 87 may extend between the sections of the trap and the waterway. A simialr rib or material 88 may likewise extend between the trap and the bowl, with these ribs being formed during the blow molding operation as a result of plastic material being clamped together between the blow mold sections. Additionally, a fused seam 89 may extend along the reference plane of the trap, likewise as a result of the blow molding operation.

The preferred method of making the integral bowl, waterway and trap of the present invention involves a blow molding operation which is illustrated in FIGS. 8-12.

This method includes, first, positioning a tubular plastic parison 100 between the sections 110 and 120 of a blow mold. Preferably, the parison is downwardly extruded from an extruder 112 positioned about the blow molds. Most preferably, the plastic material is polypropylene, but may alternatively be other thermoplastic materials which will afford the previously discussed advantages of the present invention such as ABS or polyvinyl chloride.

Next, a blow pin 130 is raised for insertion within the parison 100, and the blow mold sections 110 and 120 are closed by piston rods 132 and 134 of conventional hydraulic rams (not shown). Thereafter, blow air at a pressure of approximately 100 psi is injected into the interior of the parison to expand the mold-enclosed plastic material against the mold cavity surfaces to form the article 150 shown in FIG. 12. After retaining the blown article in the mold for an appropriate dwell time for cooling, on the order of about two minutes, the mold sections 110 and 120 are opened and the article 150 is ejected.

Figures 10, 11, 12:
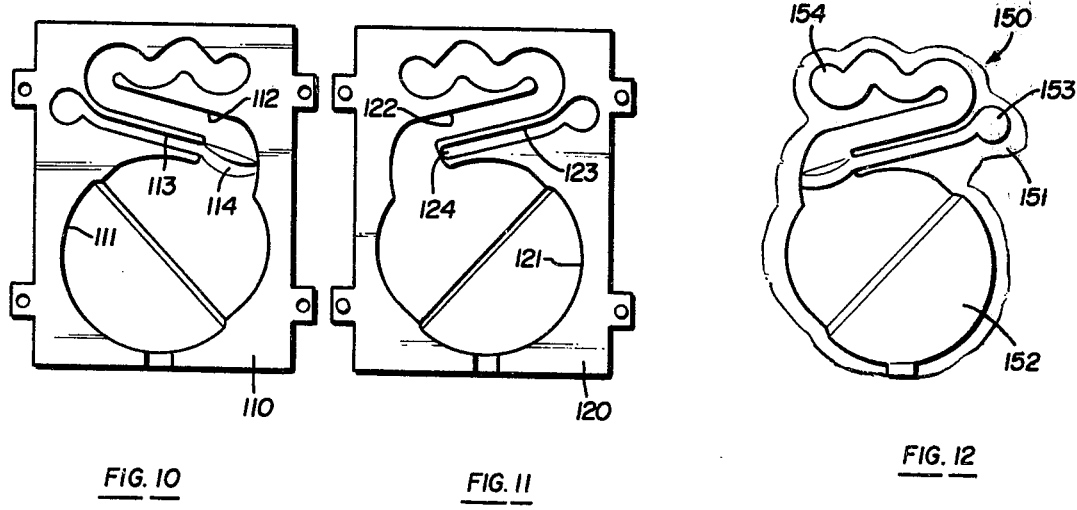
FIGS. 10 and 11 illustrate the mold cavity configurations of the two blow mold sections.
FIG. 12 illustrates the blown article after removal from the blow mold sections but prior to the trimming operations.

As shown in FIG. 12, article 150 includes not only the integral product illustrated in FIGS. 1–7 but also includes excess peripheral plastic material 151 formed by closing the mold sections onto excess parison material. Additionally, hemispherical excess portions 152, 153, and 154 respectively adjacent the bowl portion, the inlet of the waterway, and the outlet of the trap result from the mold cavity configuration. Thus, trimming operations must ultimately be performed to remove the unnecessary plastic materials. These trimming operations will necessarily involve the removal of hemispherical portions 152, 153, and 154 and beyond that may also include the removal of the excess peripheral plastic material 151 as desired, for example to leave ribs of reinforcing material as shown by reference numerals 86, 87, and 88 in FIG. 1.

FIGS. 10 and 11 illustrate that the mold sections 110 and 120 are essentially identical, but differ in the region of the waterway. More specifically, the mold sections include semi-bulbous cavity portions 111 and 121 which cooperatively conform in shape to the bowl 60 and the hemispherical portion 152. Extending away from the major bulbous cavities 111 and 121 are the trap cavities 112 and 122. These trap cavities are essentially identical and conform to the shape of trap sections 81 and 84 and the hemispherical excess region 153. Nonidentical waterway sections 113 and 123 extend between the trap and bulbous cavity portions and conform to the configuration of waterway 72 and the hemispherical portion 153. Cavity portion 113 includes a curved recess which forms the indent 64, whereas cavity portion 123 terminates in a mold projection 124 which forms the wall surface 74 at the end of the waterway 70.

Accordingly, the method of the present invention includes enclosing a major portion of the parison within the bulbous mold cavity. Additionally, a second portion of the parison is pinched shut along a tortuous line to conform to the trap configuration and a third portion of the parison is pinched shut to form the outline of the waterway. Since the plastic material is at a heated, formable temperature when the molds are closed, the pinch lines in the waterway and trap form seams as shown by reference numerals 78 and 89. Very importantly, the seams do not constitute joints and provide essentially smooth interior surfaces of the final product. Further, since these seams are formed during the blow molding operation, the plastic material in the seams is exposed to essentially the same thermal history as the plastic material in the other portions of the article.

As shown in FIGS. 10-12, the blow mold cavity is oriented so that the trap and waterway are at the top and the bowl is at the bottom. This is desired because the plastic parison tends to thin at the top as a result of its own weight and as a result of that portion of the parison being slightly hotter. Since it is thinner, that parison portion is preferably used to form the trap and waterway portions of the final article, where smaller blow up ratios are required.

It is to be understood that the foregoing disclosure is exemplary in nature, the invention being limited only by the following appended claims and their legal equivalents.

Having therefore completely and sufficiently described our invention, we now claim:

1. In a method of forming a unitary blow molded bowl, waterway and trap for a gravity-flush toilet which is free of any joints, the steps of:
   (a) downwardly extruding a tubular parison of thermoplastic material, the parison being thinner at the top due to the weight of the parison and due to that portion of the parison being hotter as a result of its being extruded last;
   (b) positioning said tubular parison of thermoplastic material between a pair of blow mold sections, each of said sections including a semibulbous bowl cavity portion and a trap cavity portion extending from said bowl cavity portion, said mold sections including non-identical waterway sections which extend between said trap and bowl cavity portions;
   (c) orienting said blow mold sections such that the trap and waterway sections are near the top of said parison and said bowl cavity portions are near the bottom of said parison;
   (d) closing the blow mold sections on the parison and forming a blowable shape comprising parison portions destined to form the bowl, trap and waterway, by simultaneously (i) enclosing the thicker bottom major part of the parison within the bulbous major part of the blow mold cavity, including the bowl for the final article, (ii) pinching a portion of the parison shut along a tortuous path communicating with the major part of the blow mold cavity amd conforming to the trap, and (iii) pinching another portion of the parison shut along a waterway communicating with the major part of the parison between the trap and the bowl parison portions; and
   (e) introducing blow air under pressure into the interior of the parison and thereby (i) expanding the major part of the parison into a bulbous shape including the bowl and (ii) expanding the pinched-shut parison portions respectively into a tortuous-shaped trap and a waterway;
   (f) removing the blown article from the mold cavity, and trimming excess peripheral plastic material from said blown article to leave ribs of reinforcing material between said waterway and trap and between said waterway and bowl.

* * * * *